United States Patent [19]

Barten et al.

[11] Patent Number: 5,322,209
[45] Date of Patent: Jun. 21, 1994

[54] ALUMINUM HEAT EXCHANGER BRAZING METHOD AND APPARATUS

[75] Inventors: Brian L. Barten; Gary A. Halstead, both of Lockport, N.Y.

[73] Assignee: General Motors Corporation, Detroit, Mich.

[21] Appl. No.: 92,857

[22] Filed: Jul. 19, 1993

[51] Int. Cl.$^5$ ............................................. B23K 31/02
[52] U.S. Cl. .................................. 228/183; 228/223; 228/232
[58] Field of Search ............... 228/183, 200, 207, 223, 228/232, 233.2, 262.51, 219; 29/890.054

[56] References Cited

U.S. PATENT DOCUMENTS

| | | | |
|---|---|---|---|
| 3,853,637 | 12/1974 | Grey et al. | 228/183 |
| 4,231,508 | 11/1980 | Wagner | 228/219 |
| 5,062,476 | 11/1991 | Ryan et al. | 165/173 |
| 5,172,847 | 12/1992 | Barten et al. | 228/18 |

Primary Examiner—Samuel M. Heinrich
Attorney, Agent, or Firm—Patrick M. Griffin

[57] ABSTRACT

The brazing process for an aluminum headered condenser is improved by adding a flux drying and preheating process that both dries the wet flux layer and prepares the part for more efficient brazing. An oven is divided into two directly connected zones, one that dries the flux layer at a lower temperature, and one that preheats the condenser at a higher temperature that is still too low to melt the flux layer. Both the tanks and the core of the condenser are heated hotter than they would be if they were only flux dried, although the core is heated significantly more. The preheated parts are then transported to the braze furnace indirectly, through ambient, which serves to cool the core more than the tanks, to a temperature lower than the tanks. Finally, the part is run through a normal braze cycle. Because the tanks begin hotter than normal, they reach braze melt temperature sooner than they normally would. Because the core starts out cooler than the tanks, they reach braze temperature closer in time to the tanks.

3 Claims, 3 Drawing Sheets

ALUMINUM HEAT EXCHANGER BRAZING METHOD AND APPARATUS

This invention relates to methods and apparatuses for convection brazing of aluminum heat exchangers in general, and specifically to a novel method for flux drying and preheating so as to increase the efficiency of the brazing process.

BACKGROUND OF THE INVENTION

Aluminum heat exchangers, radiators, evaporators, condensers and the like, are typically manufactured from aluminum alloy that is coated with a thin surface layer of braze material, which has a lower melting point than the base alloy layer. The various components of the heat exchanger, tanks, slotted header plates, tubes, cooling fins, etc, are held together temporarily with various fixtures, and then cycled through a braze oven. In the braze oven, the heat exchanger is brought to a temperature just sufficient to melt the surface layer of braze material, but not the base alloy. The parts are held together with a close clearance wherever a braze joint is desired, as between tube ends and tank header slots, or between cooling fin peaks and tube surfaces. In these close clearances, molten braze material is drawn in by capillary action, later solidifying to form braze joints. The braze process per se is proceeded by a fluxing step, in which the part is sprayed with a coating of waterborne chemical that acts to remove any oxidation on the part during the braze process. The part must be dried, leaving only the solid flux layer, before brazing. The flux chemical acts to absorb any surface oxidation that would otherwise interfere with the formation of good braze seams.

Braze ovens include the radiant heat type, in which a part is conveyed through a space that has heat simply radiated passively into it, as well as newer, convection types, such as that shown in coassigned U.S. Pat. No. 5,172,847. Convection type furnaces actively force heated gas, which must be an inert gas such as nitrogen, at the part, so as to heat it more quickly. The part must be brought to braze temperature, that is, to the temperature at which the braze layer liquifies, quickly enough so that the part will have time enough in the braze cycle to form the necessary braze seams and joints. One relatively new type of brazed heat exchanger is the so called tank and tube or headered condenser, an example of which may be seen in coassigned U.S. Pat. No. 5,062,476. This design has a pair of side tanks that are extruded from a fairly thick aluminum stock, so as to resist the relatively high pressures involved. As a consequence, the sides of the condenser are high in mass, and a concentrated mass, with relatively little exposed surface area per unit of mass. The tubes and fins that run between the tanks, however, are lower in mass, since they must conduct heat quickly, with a lot of exposed surface area. Consequently, there is a significant potential time delay between the high and low mass areas of the part reaching braze temperature, within a given braze cycle time, which might necessitate the use of longer braze cycle times to let the higher, more concentrated mass areas "catch up". This means longer, larger, and consequently more expensive braze ovens.

SUMMARY OF THE INVENTION

The invention provides a method for improving efficiency of the braze process for a heat exchanger of the type described above. A flux drying oven is provided that has two zones in series. In the first, drying zone, the wet sprayed part is subjected to a stream of upwardly forced hot air at a temperature that is just sufficient to dry it, and leave the solid, dry flux layer. The part then moves directly to an adjacent preheating zone in the same oven where it is subjected to a downward stream of hotter air that has a temperature capability just below the temperature at which the dry flux layer would begin to melt. This does not assure that both, or even either, area of the part will reach that temperature. But, it does serve to bring both areas of the part, the high mass and low mass, to a higher temperature than a normal flux drying operation would achieve. It also, in general, serves to bring the lower mass areas to a higher temperature than the higher mass areas. However, the convected hot air may, if desired, be directed preferentially at the higher mass tanks, thereby heating them more.

Next, the part is conveyed to the braze furnace, but not directly. Instead, the part is deliberately passed through the ambient atmosphere for a time long enough to cool the lower mass areas of the part significantly relative to the higher mass areas. Because no flux or braze layer has melted at this point, exposure to oxygen is not harmful. Finally, the parts are conveyed through the braze furnace as they normally would be. Since the high mass areas are beginning the process at a higher than normal temperature, they reach braze temperature sooner than they otherwise would. The lower mass areas, though starting at a lower temperature, heat more quickly, and both areas of the part reach braze temperature more nearly simultaneously than they otherwise would. Both factors, the quicker heating of the high mass areas, and the more nearly simultaneous attainment of braze temperature across the entire part, make the braze process more efficient, and allow existing braze furnaces and cycle times to be used.

DESCRIPTION OF THE PREFERRED EMBODIMENT

These and other features of the invention will appear from the following written description, and from the drawings, in which.

Figure 1:
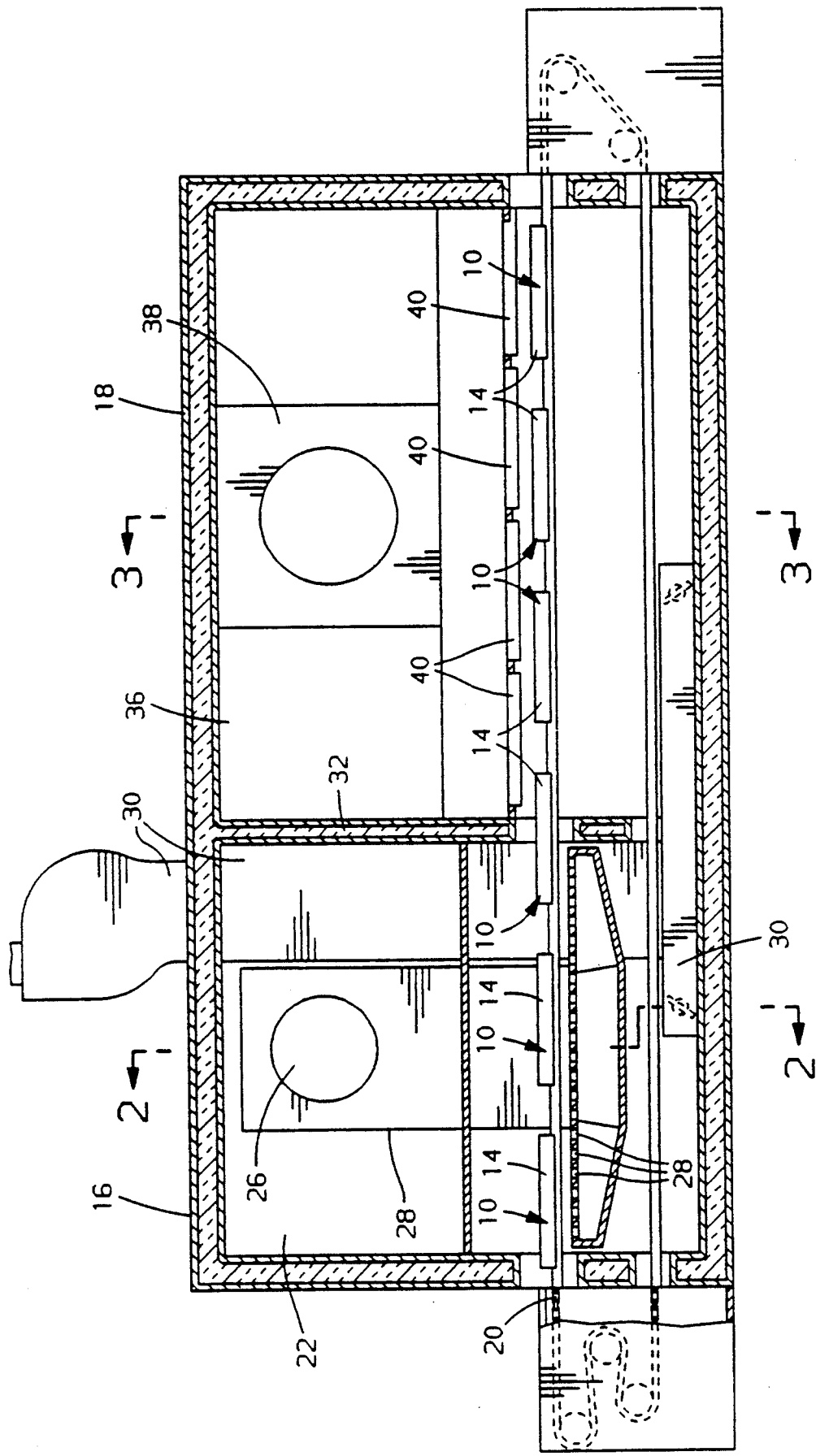
FIG. 1 is a sectional side view of a two-zone, drying and preheating oven apparatus used to practice the method of the invention.
Figure 2:
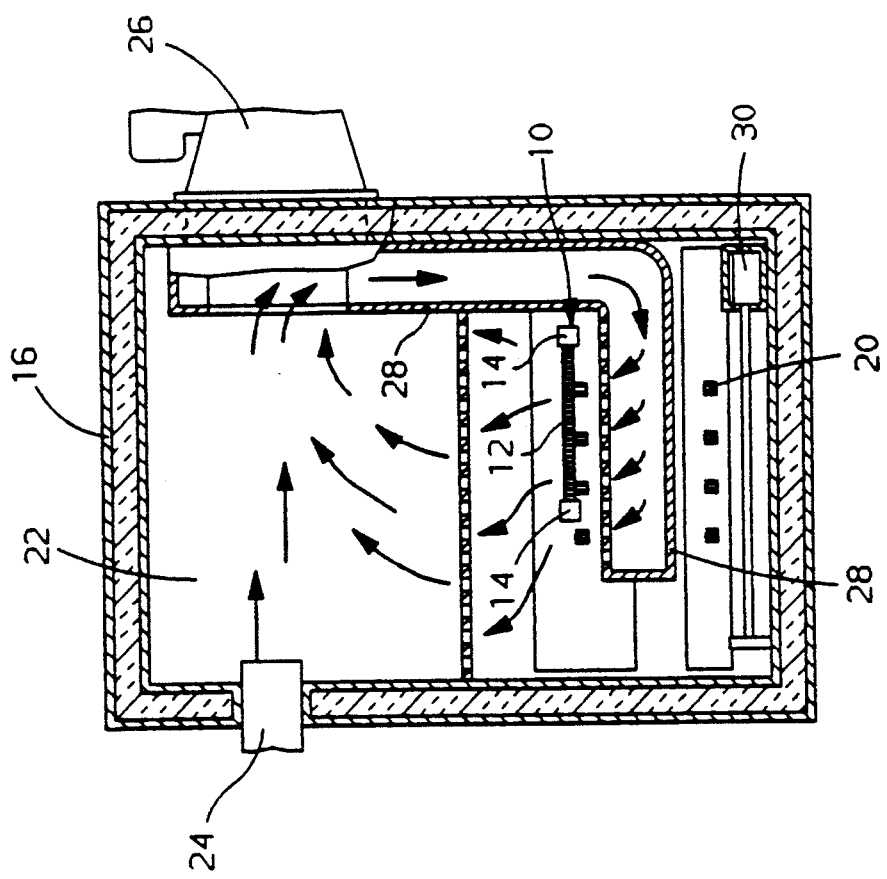
FIG. 2 is a sectional view taken along the line 2—2 of FIG. 1.

Referring first to FIGS. 1 and 2, the method of the invention is used in the manufacture of a heat exchanger, which is a headered condenser, indicated generally at (10), of the type described above. Condenser (10) has a lower mass central portion or core (12), which consists of relatively thin tubes and fins, bounded by a pair of heavy, high mass side tanks (14). The details of condenser (10), beyond the fact that it has high and low mass areas in general, are not critical to an understanding of the invention. The particular embodiment of the apparatus disclosed is especially adapted to condenser (10), however. The apparatus shown in detail is a combined flux dry and preheat oven comprised of two directly connected zones, a flux drying zone (16) and a preheat zone (18). Each zone comprises basically an insulated box or chamber, through which a continuous conveyor chain (20) runs. Neither zone needs a sealed or pressurized inert gas atmosphere, as in a braze oven, although similar heating mechanisms are applied. Flux dry zone (16) includes an upper chamber or plenum (22) from which heated air pulled in by a burner (24) is drawn by a fan (26) and sent through a louvered supply duct (28) that runs beneath the conveyer chain (20) and the condensers (10) resting thereon. Upwelling hot air passes through the conveyer chain (20), through the core (14), around the tanks (14), and circulates back up into plenum (22), as shown by the arrows. As outside air is continually being drawn into plenum (22) through burner (24), combustion products, which tend to sink down, are continually drawn up and exhausted out through a common exhaust duct and fan assembly (30). More detail about the process parameters, as opposed to the structural details of the apparatus given here, are given below.

Figure 3:
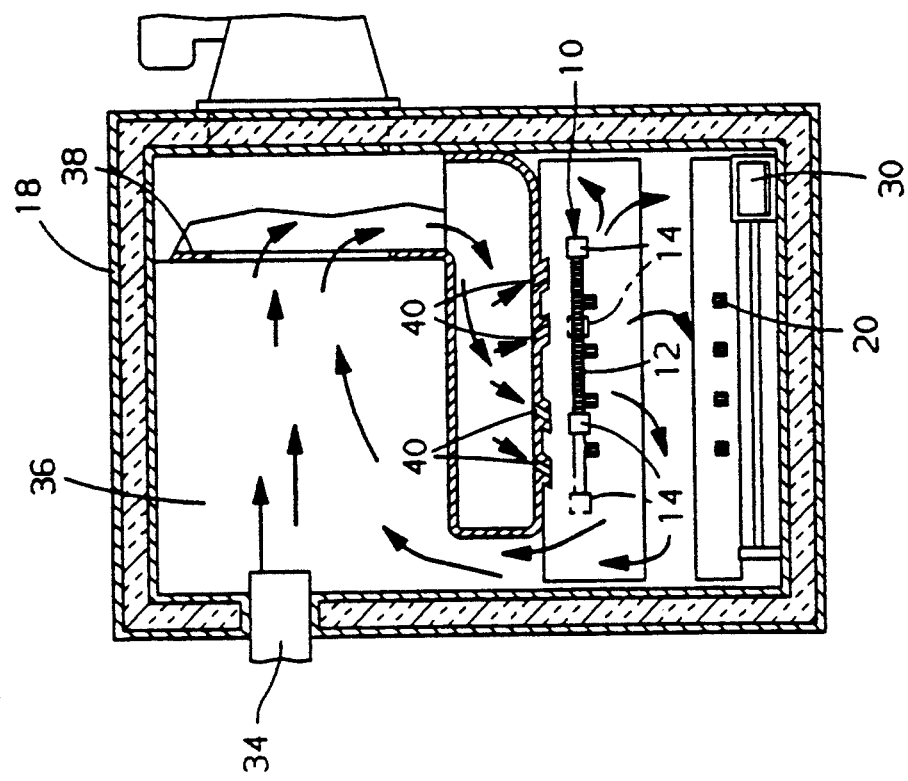
FIG. 3 is a sectional view taken along the line 3—3 of FIG. 1.

Referring next to FIGS. 1 and 3, preheat zone (18) is directly adjacent drying zone (16), separated therefrom by an insulated divider wall (32) that is not intended to act as a complete seal, but which does provide temperature separation. Preheat zone (18) also has a burner (34) that pulls heated air into an upper plenum (36), from which it is forced downwardly by a duct and fan assembly (38) through elongated louvers (40) toward the condensers (10). The downwardly forced air circulates back up to either side of conveyor chain (20). As in the drying zone (16), heavier combustion products sink down and are exhausted through the same exhaust assembly (30). It will be noted that the louvers (40) are oriented so as to run parallel to the conveying path followed by the tanks (14), and are angled out slightly, toward the tanks (14), for a purpose described further below.

Referring next to FIGS. 1 through 3, the steps in and parameters of the process are described in more detail. Before being introduced to the drying zone (16), tank (10) is first sprayed with a wet slurry of flux material, such as potassium fluoroaluminate, which is as much as three-quarters water. This needs to be dried initially, which occurs in zone (16) at a temperature of approximately 500-650 degrees F. The indirect, upwardly directed stream of hot air is preferable for the water removal step for a number of reasons. It is gentler, since the air is diffused both through the louvered supply duct (28), and through the conveyor chain (30). Again, only water removal and drying is desired, with minimal disturbance of the part, and temperature achieved by the part is not that significant. From zone (16), the dried and now flux coated condensers (10) are conveyed directly into zone (18), at a conveyor speed of approximately 6 feet a minute, and for a total time in both zones of 3-½ minutes. This is significantly longer than the drying time that would normally be spent just in flux drying, but there is a net saving in total process time, as is described further below. In zone (18), the condensers (10) experience a forceful downdraft of much hotter air, with temperatures as high as 1030 degrees F. Since the flux layer is dry at this point, there is no danger of blowing it off, and the consideration is now preheating, rather than drying, a step that was not carried out previously. The temperature of 1030 degrees is chosen deliberately as being as hot as possible and yet still lower than the temperature at which the particular flux used would melt, about 1040 degrees F. The braze material will not melt, either, at this temperature. This is an insurance factor, since condenser (10) will normally not reside long enough to reach the full temperature capability of the air stream. At any rate, there is no need for an inert gas environment, since there is no melt. What does occur is that the two distinct regions of the condenser (10) are heated, but at different rates, and to different final temperatures. For example, the core (12) may attain a temperature as high as 850 degrees, while the tanks (14) reach only 700 degrees, being slower to heat. Another feature of preheat zone (18) may be seen in FIG. 3. The four sets of elongated louvers (40) direct hot air preferentially at the tanks (14), since they run colinear to the tanks (14), that is, to the path that they follow. Moreover, as shown by the dotted lines in FIG. 3, should the condenser (10) be displaced to either side on conveyer (20), one pair of the sets of louvers (40) should still be substantially aligned with the tanks (14) regardless, so as to heat them efficiently.

Figure 4:
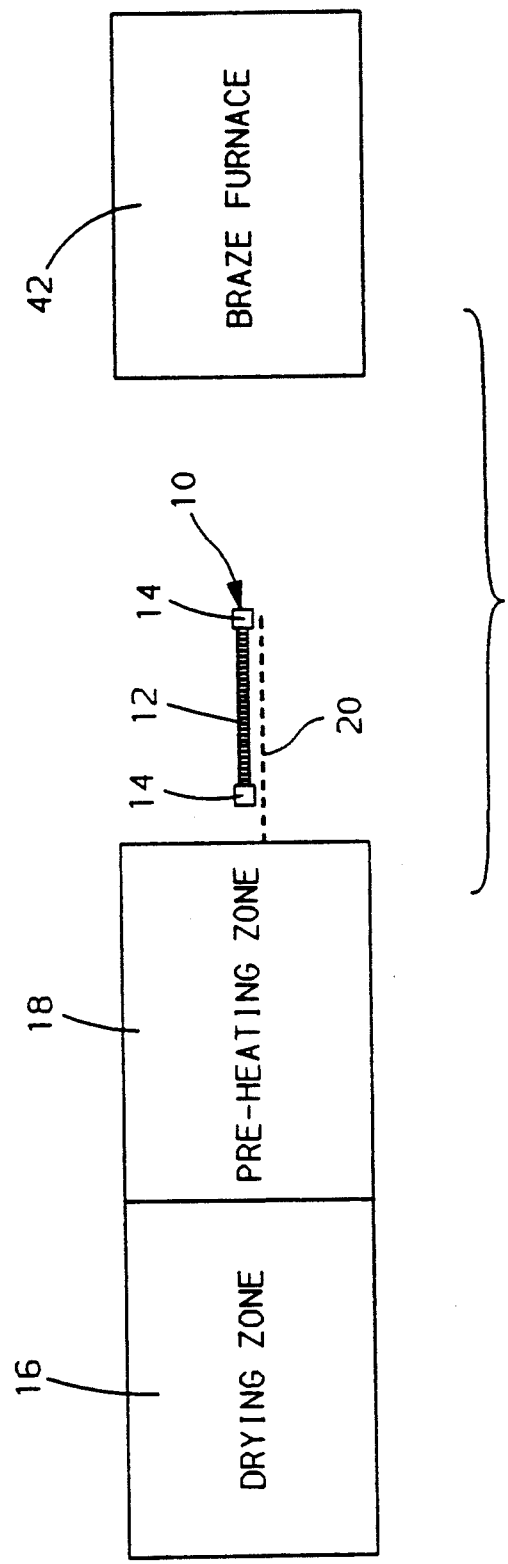
FIG. 4 is a schematic view of the apparatus in FIG. 1 plus a standard braze furnace depicting the transport of the preheated parts to the braze furnace.

Referring next to FIG. 4, the final step in the prebrazing process is to physically transport the preheated condensers (10) from zone (18) to a braze furnace, indicated schematically at (42). Again, braze furnace (42) would be the type described above and disclosed in detail in prior patents, such as U.S. Pat. No. 5,172,847. Transport could be done by any means, but it is significant that no attempt is made to convey the preheated parts directly from the preheat zone (18) to braze furnace (42), as between the two zones (16) and (18), though that would seem to be the logical step, so as to avoid any loss of the work done in the preheat zone (18). Instead, the preheated condensers (10) are deliberately moved through the ambient, for about 50 seconds to a full minute, on their way to braze furnace (42). This has the effect of substantially cooling the core (12), since it is designed to cool quickly, by as much as 200 degrees. The tanks (14), on the other hand, due to the fact that they have a higher mass and are not designed either to heat or cool quickly, maintain most of the lower temperature that they attained in zone (18), cooling down by perhaps only 50 degrees. As a consequence, as the condensers (10) enter braze oven (42), they are not only hotter in general than they would be had they not been preheated, but the higher mass tanks (14) are actually now hotter than the core (12), which they normally would not be. Now, in braze oven (42), the process is reversed. The core (12) will heat up more quickly than the tanks (14) but, since it starts from a lower temperature than the tanks (14), the two areas reach braze temperature with more simultaneity than they otherwise would. Both factors, the hotter than conventional beginning temperature of the tanks (14), and the lower (than the tanks (14)) starting temperature of the core (12), means that the entire condenser (10) gets to "temperature", that is, to the point where the braze material liquifies, sooner, and more evenly across the part. This makes the braze process more efficient, allows a shorter braze cycle time, and consequently allows a shorter furnace to be used, that is, one in which the part need not be conveyed through for as long a time.

Variations in the disclosed apparatus and method could be made. For example, the louvers (40) need not absolutely be oriented as they are. The lower and higher mass areas will heat differentially regardless. However, it is useful to give heating preference to the tanks (14), in a case where the shape of the part is amenable. The condensers could be dryed and preheated by some means other than forced air, though forced convection is generally faster, as it is in the brazing process itself. Therefore, it will be understood that it is not intended to limit the invention to just the embodiments disclosed.

What is claimed is:

1. A method for brazing aluminum heat exchangers of the type having relatively higher mass areas and relatively lower mass areas in which a wet flux layer is applied prior to brazing, comprising the steps of, drying the wet fluxed heat exchanger in a first, drying zone at a temperature just sufficient to dry the wet flux layer, preheating the dried heat exchanger in a second, preheating zone directly after the drying zone at a temperature sufficient to bring both areas of the heat exchanger to a higher preheat temperature lower than the flux melting temperature, transporting the preheated heat exchanger from the preheating zone indirectly to a braze furnace, through the ambient, over a transport time sufficient to cool the lower mass area of the preheated heat exchangers to a lower temperature but short enough to maintain the higher mass areas close to the preheat temperature, and, moving the preheated heat exchangers through a braze oven over a braze cycle time sufficient to bring the lower and higher mass areas of the heat exchangers to braze temperature substantially simultaneously.

2. A method for brazing aluminum heat exchangers of the type having relatively higher mass areas and relatively lower mass areas in which a wet flux layer is applied prior to brazing, comprising the steps of, drying the wet fluxed heat exchanger in a first, drying zone at a temperature just sufficient to dry the wet flux layer with a stream of forced air directed upwardly relative to the heat exchanger, preheating the dried heat exchanger in a second, preheating zone directly after the drying zone at a temperature sufficient to bring both areas of the heat exchanger to a preheat temperature lower than the flux melting temperature with a stream of forced air directed downwardly relative to the heat exchanger, transporting the preheated heat exchanger from the preheating zone indirectly to a braze furnace, through the ambient, over a transport time sufficient to cool the lower mass area of the preheated heat exchangers to a lower temperature but short enough to maintain the higher mass areas close to the preheat temperature; and, moving the preheated heat exchangers through a braze oven over a braze cycle time sufficient to bring the lower and higher mass areas of the heat exchangers to braze temperature substantially simultaneously.

3. A method for brazing aluminum heat exchangers of the type having relatively higher mass areas and relatively lower mass areas in which a water soluble flux layer is applied prior to brazing, comprising the steps of, drying the wet fluxed heat exchanger in a first, drying zone at a temperature just sufficient to dry the wet flux layer with a stream of forced air directed upwardly relative to the heat exchanger, preheating the dried heat exchanger in a second, preheating zone directly after the drying zone at a temperature sufficient to bring both areas of the heat exchanger to a preheat temperature just lower than the flux melting temperature with a stream of forced air directed downwardly relative to the heat exchanger and directed preferentially toward the higher mass areas thereof, transporting the preheated heat exchanger from the preheating zone indirectly to a braze furnace, through the ambient, over a transport time sufficient to cool the lower mass area of the preheated heat exchangers to a lower temperature but short enough to maintain the higher mass areas close to the preheat temperature, and, moving the preheated heat exchangers through a braze oven over a braze cycle time sufficient to bring the lower and higher mass areas of the heat exchangers to braze temperature substantially simultaneously.

* * * * *